(12) United States Patent
Gianvittorio

(10) Patent No.: US 9,622,108 B2
(45) Date of Patent: Apr. 11, 2017

(54) EXPANDABLE ANALOG MANIFOLD

(71) Applicant: RAYTHEON COMPANY, Waltham, MA (US)

(72) Inventor: John Paul Gianvittorio, Torrance, CA (US)

(73) Assignee: RAYTHEON COMPANY, Waltham, MA (US)

( * ) Notice: Subject to any disclaimer, the term of this patent is extended or adjusted under 35 U.S.C. 154(b) by 191 days.

(21) Appl. No.: 14/668,565

(22) Filed: Mar. 25, 2015

(65) Prior Publication Data

US 2017/0026871 A1    Jan. 26, 2017

(51) Int. Cl.
| | |
|---|---|
| *H04B 1/38* | (2015.01) |
| *H04M 1/00* | (2006.01) |
| *H04W 28/02* | (2009.01) |
| *H04B 7/01* | (2006.01) |
| *H04B 7/08* | (2006.01) |
| *H04B 7/06* | (2006.01) |

(52) U.S. Cl.
CPC ........ *H04W 28/0252* (2013.01); *H04B 7/01* (2013.01); *H04B 7/0602* (2013.01); *H04B 7/0802* (2013.01)

(58) Field of Classification Search
CPC ... H04W 28/0252; H04B 7/01; H04B 7/0602; H04B 7/0686; H04B 7/0802; H04B 7/0868; H04L 12/02
See application file for complete search history.

(56) References Cited

U.S. PATENT DOCUMENTS

| | | | |
|---|---|---|---|
| 3,534,264 | A | 10/1970 | Blasbalg et al. |
| 5,255,332 | A | 10/1993 | Welch et al. |
| 5,789,997 | A | 8/1998 | Dekker |
| 5,880,648 | A | 3/1999 | Aves et al. |
| 8,842,765 | B2 | 9/2014 | Kludt et al. |
| 2012/0182174 | A1* | 7/2012 | Feil ........... G01S 13/422 342/113 |

(Continued)

FOREIGN PATENT DOCUMENTS

| | | | |
|---|---|---|---|
| EP | 1014468 | A2 | 6/2000 |
| EP | 1014468 | A3 | 11/2001 |

OTHER PUBLICATIONS

Notification of Transmittal of the International Search Report and the Written Opinion of the International Searching Authority, or the Declaration dated May 20, 2016 in connection with International Application No. PCT/US2016/014597, 10 pages.

(Continued)

*Primary Examiner* — Nguyen Vo

(57) ABSTRACT

An n input, radio frequency (RF) signal matrix is formed of a plurality of two-to-one RF signal routing units each including first, second, and third switching units selectively connecting either a first input to an output via a bypass conductive path while electrically isolating first and second signal combining conductive paths from the output or first and second inputs to the output via first and second signal combining conductive paths while electrically isolating the bypass conductive path from the output. The RF signal routing units are connected in at least two levels with outputs from a first level connected to inputs for a second level to form the n inputs for the RF signal matrix. Any number of the n inputs may be employed without unused inputs loading the output.

20 Claims, 7 Drawing Sheets

(56) References Cited

U.S. PATENT DOCUMENTS

2013/0088381 A1 4/2013 Puzella et al.
2013/0324055 A1 12/2013 Kludt et al.
2014/0299743 A1* 10/2014 Miller .................. G02B 27/145
　　　　　　　　　　　　　　　　　　　　　　250/204

OTHER PUBLICATIONS

Chan, E., et al. "Monolithic Crossbar MEMS Switch Matrix." Microwave Symposium Digest, 2008 IEEE MTT-S International. IEEE, 2008, 4 pages.

* cited by examiner

EXPANDABLE ANALOG MANIFOLD

GOVERNMENT LICENSE RIGHTS

This invention was made with Government support under HR0011-14-C-0002 awarded by Department of Defense. The Government has certain rights in the invention.

TECHNICAL FIELD

The present disclosure is directed in general to analog combination and/or routing of radio frequency signals, and, more particularly, to an expandable analog manifold for radio frequency signals.

BACKGROUND OF THE DISCLOSURE

Analog manifolds are employed to combine and/or route radio frequency (RF) signals from an arbitrary number of inputs to an arbitrary number of outputs. For example, an analog manifold may be employed to reconfigure the subarray size for a phase array. However, designs that accommodate up to n inputs may introduce unacceptable signal losses when employed to route less than n inputs.

There is, therefore, a need in the art for an improved analog manifold design that minimizes loss regardless of the number of input elements and output ports.

SUMMARY OF THE DISCLOSURE

An n input, radio frequency (RF) signal matrix is formed of a plurality of two-to-one RF signal routing units each including first, second, and third switching units selectively connecting either a first input to an output via a bypass conductive path while electrically isolating first and second signal combining conductive paths from the output or first and second inputs to the output via first and second signal combining conductive paths while electrically isolating the bypass conductive path from the output. The RF signal routing units are connected in at least two levels with outputs from a first level connected to inputs for a second level to form the n inputs for the RF signal matrix. Any number of the n inputs may be employed without unused inputs loading the output.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
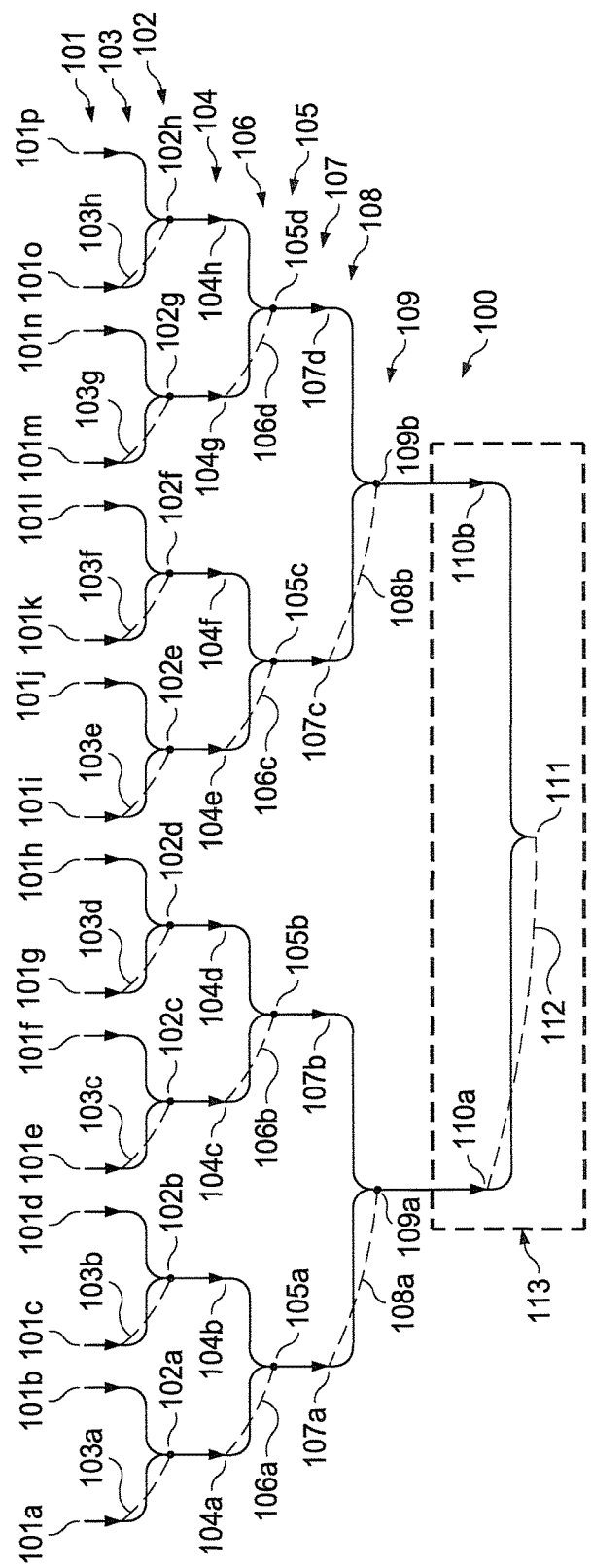
FIG. 1 diagrammatically illustrates an expandable RF signal matrix for routing and/or combining RF signals from any number of inputs to any number of outputs in accordance with embodiments of the present disclosure.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

An analog manifold with low power loss for unused ports would be useful for changing the subarray size of an antenna array employed for radar or communications. Digital beamforming is one way to arbitrarily change the subarray size, but analog manifolds could potentially consume much less power than digital beamforming. RF designers use RF splitters for many applications, but the split is always fixed. Similarly, RF manifolds for combining and/or routing RF signals are typically fixed in size, with a defined number of inputs and outputs. However, changing subarray size requires two combinations of input:output port numbers, one having a larger number of inputs or outputs than the other. When used for fewer inputs or outputs, terminating the unused ports into loads results in unnecessary power losses that could exceed the power loss of digital beamforming.

FIG. 1 diagrammatically illustrates an expandable RF signal matrix for routing and/or combining RF signals from any number of inputs to any number of outputs in accordance with embodiments of the present disclosure. The signal matrix 100 is formed by a tiered arrangement of 2:1 RF signal routing units each having two inputs and a single output. In the example shown, a 16:1 signal matrix is formed by fifteen 2:1 RF signal routing units, eight in a first level, four in a second level, two in a third level and one in the last level. Each 2:1 RF signal routing unit in the first level has two of inputs 101 (that is, 101a/101b, 101c/101d, 101e/101f, 101g/101h, 1010i/101j, 101k/1010l, 101m/101n, and 1010/101p), which also serve as the inputs to the signal matrix 100. The RF signal routing units in the first level include outputs 102 (that is, 102a, 102b, 102c, 102d, 102e, 102f, 102g and 102h) connected to the two respective inputs and a bypass 103 (that is, 103a, 103b, 103c, 103d, 103e, 103f, 103g and 103h) that may be selectively activated to bypass the structure connecting the two inputs to the output. For example, bypass 103a bypasses the structure connecting inputs 101a and 101b to output 102a. Each 2:1 RF signal routing unit in the remaining levels has the same structure just described, with the RF signal routing units in the second level having pairs of inputs 104 (that is, 104a/104b, 104c/104d, 104e/104f, and 104g/104h) connected to respective ones of the outputs (105a, 105b, 105c and 105d) and with a selectively activated bypass 106 (106a, 106b, 106c and 106d). As depicted, each input 104 of a second level RF signal routing unit is connected to an output 102 of a first level RF signal routing unit. Likewise, each output 105 of a second level RF signal routing unit is connected to an input 107 of a third level RF signal routing unit. Input pairs 107a/107b and 107c/107d are connected to outputs 109a and 109b, respectively, with a structure that may be selectively bypassed by bypasses 108a and 108b, respectively. The sole fourth level RF signal routing unit has inputs 110a and 110b connected to the outputs 109a and 109b of the third level RF signal routing unit, a single output 111 that serves as the output for the signal matrix 100, and a bypass 112. It should be noted that each of the outputs 102, 105 and 109 of the first, second and third level RF signal routing units may be selectively employed as outputs for the signal matrix 100, as discussed further below.

Figure 1A:
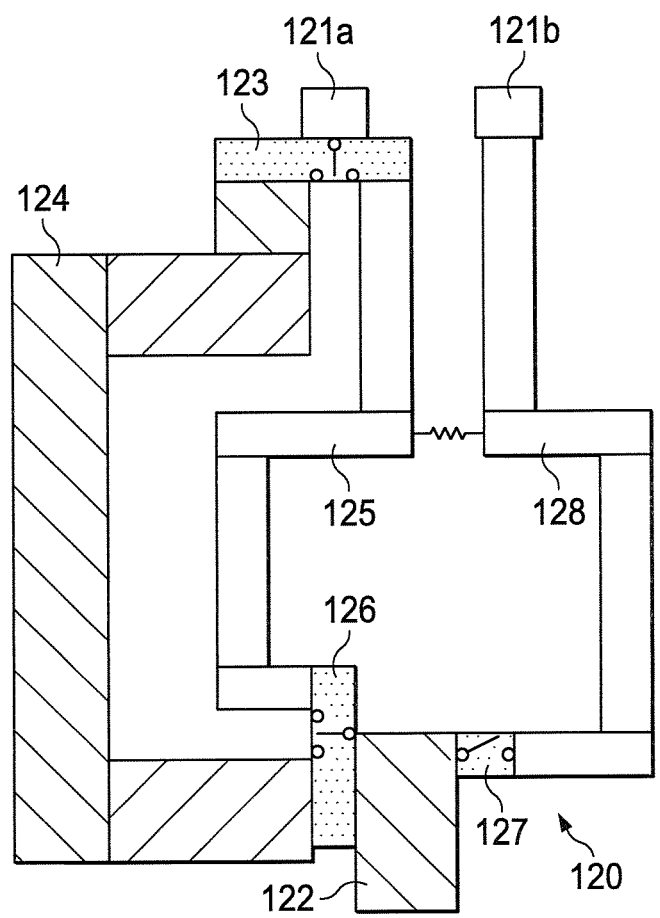
FIG. 1A depicts a layout for an RF signal routing unit within the expandable RF signal matrix of FIG. 1.

FIG. 1A illustrates an RF signal routing unit within an expandable RF signal matrix in accordance with embodiments of the present disclosure. The layout 120 depicted is similar to a layout for a Wilkinson power divider with a bypass path, and is used for each of the RF signal routing units described above in connection with FIG. 1. Each RF signal routing unit has two inputs 121a and 121b for receiving either a single signal (at one of the two inputs) or two signals (each at one of the two inputs). The inputs 121a and 121b are connected by switching units and conductive paths to an output 122. A first switching unit 122 connects one of two conductive paths 124 and 125 to the input 121a, where each conductive path 124 and 125 extends (in parallel) between switching device 123 and switching device 126. A second switching unit 126 connects the same one of the two conductive paths 124 and 125 to the output 122. A third switching unit 127 connects a third conductive path 128, which is fixedly connected to the second input 121b and extends between input 121b and switching device 127, to the output 122.

In operation, the three switching units 123, 126 and 127 are controlled in tandem to provide either 2:1 signal routing or 1:1 signal routing. To provide 2:1 signal routing, switching unit 123 is controlled to connect conductive path 125 to the first input 121a (disconnecting conductive path 124 from the input 121a), and switching units 126 and 127 are controlled to connect signal paths 125 and 128, respectively, to the output 122. (By connecting conductive path 125 to the output 122, the switching unit 126 disconnects conductive path 124 from the output). To provide 1:1 signal routing, switching units 123 and 126 connect conductive path 124 to the input 121a and output 122, respectively (thus disconnecting conductive path 125 from the input 121a and output 122), and switching unit 127 is controlled to disconnect conductive path 128 from the output 122.

The layout 120 is designed with an impedance for conductive path 124 that differs from the individual impedance of each of conductive paths 125 and 128. Conductive path 124 is designed to be employed as the bypass in each of the RF signal routing units, while conductive paths 125 and 128 are designed to perform signal combining of signals received at respective inputs 121a and 121b. When the switching units 123, 126 and 127 are set in a first configuration, a single signal received at input 121a is routed, substantially unchanged, through the conductive path 124 to the output 122 by switching units 123 and 126. Switching units 123 and 126 electrically isolate conductive path 125 from the input 121a and output 122, and switching unit 127 electrically isolates conductive path 128 from output 122, preventing input 121b from appearing as a load at output 122. When the switching units 123, 126 and 127 are set in a second configuration, two signals each received at one of inputs 121a and 121b are routed through conductive paths 125 and 128, respectively, by switching units 123, 126 and 127 and combined at output 122. With the second configuration, conductive path 124 is electrically isolated from input 121a and output 122. As used herein, an unused input and associated conductive paths are said to "not" appear as load(s) at the output (or, equivalently, do "not" load the output) and/or "not" contribute to insertion loss or phase change because (and when) the respective load or contribution is negligible.

When the layout 120 is employed for each of the RF signal routing units depicted in FIG. 1, the input pairs (that is, input pairs 101a/101b, 101c/101d, 101e/101f, 101g/101h, 101i/101j, 101k/101l, 101m/101n, and 101o/101p for the first level, input pairs 104a/104b, 104c/104d, 104e/104f, and 104g/104h for the second level, input pairs 107a/107b and 107c/107d for the third level, and input pair 110a/110b for the fourth level) for each RF signal routing unit are implemented by the inputs 121a and 121b of the respective instance RF signal routing unit layout 120. The outputs (that is, outputs 102a, 102b, 102c, 102d, 102e, 102f, 102g and 102h for the first level, outputs 105a, 105b, 105c and 105d for the second level, outputs 109a and 109b for the third level, and output 111 for the fourth level) are each implemented by the output 122 of the respective instance RF signal routing unit layout 120. The bypasses (that is, bypasses 103a, 103b, 103c, 103d, 103e, 103f, 103g and 103h for the first level, bypasses 106a, 106b, 106c and 106d for the second level, bypasses 108a and 108b for the third level, and bypass 112 for the fourth level) are each implemented by the conductive path 124 of the respective instance RF signal routing unit layout 120.

Figure 2:
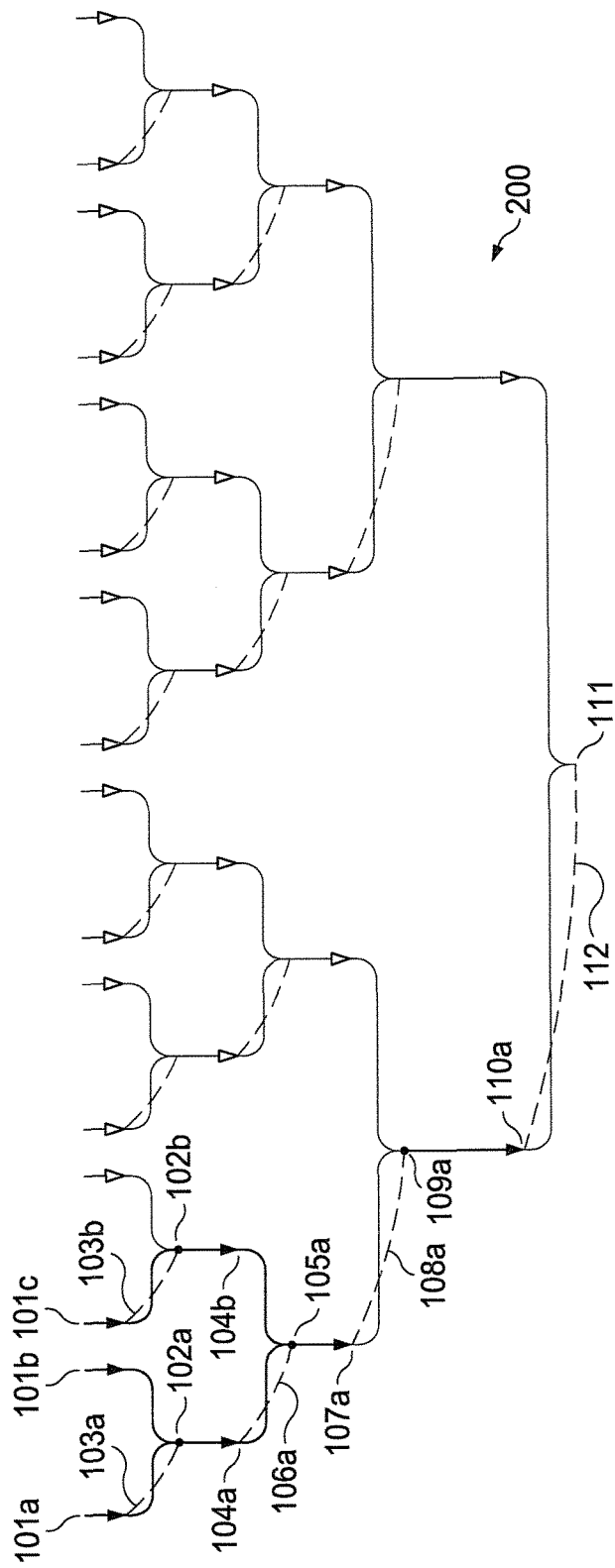
FIG. 2 diagrammatically illustrates the expandable RF signal matrix of FIG. 1 configured to operate as a three input, one output manifold.

FIG. 2 diagrammatically illustrates the expandable RF signal matrix of FIG. 1 configured to operate as a three input, one output manifold in which three inputs out of four are used and one input is not used. (In actuality, three inputs out of sixteen are used, with twelve of the sixteen inputs being electrically isolated from one of the outputs at the second level and one of the inputs electrically isolated from an output at the first level, so that those thirteen inputs do not appear as loads at the matrix output). By selectively controlling the switching units within the respective RF signal routing layout instances for each RF signal routing unit, all of the inputs except inputs 101a, 101b and 101c are electrically isolated from the output 111 (and are therefore shown in phantom, along with the respective signal paths and connections to the output 111). The RF signal routing unit connected to inputs 101a and 101b is configured by the switching units therein to combine the RF signals received at those inputs at output 102a, while the RF signal routing unit connected to input 101c employs the switching units therein to exploit the bypass 103b, connecting only the input 101c to output 102b. Outputs 102a and 102b are connected to inputs 104a and 104b. The RF signal routing unit connected to inputs 104a and 104b is configured by the switching units therein to combine the RF signals received at those inputs at output 105a. Output 105a is connected to input 107a. The RF signal routing units connected to inputs 107a and 110a each employ the switching units therein to exploit the respective bypasses 108a and 112 (where input 110a is connected to output 109a) to route the signal at output 105a to the output 111 of the matrix circuit. Signals received at the three inputs 101a, 101b and 101c are thus combined at the output 111, without losses due to apparent loads at the remaining inputs.

Figure 3:
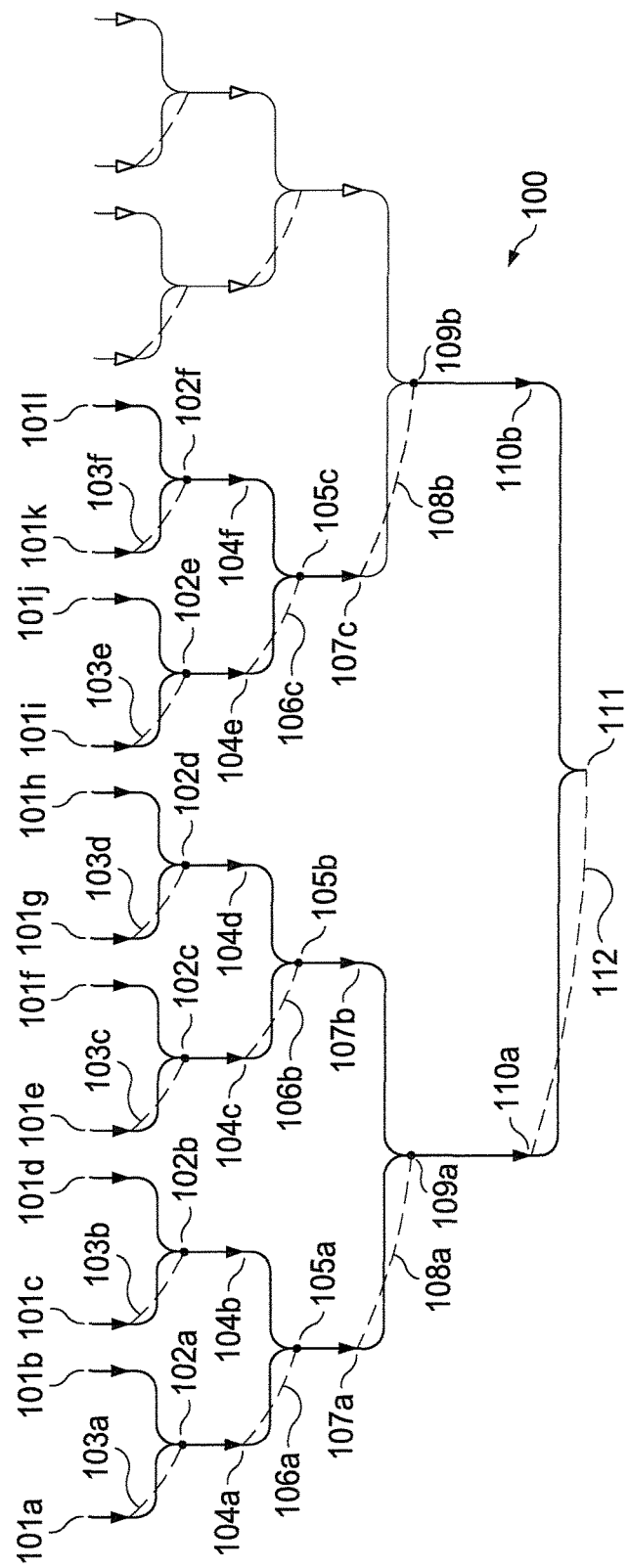
FIG. 3 diagrammatically illustrates the expandable RF signal matrix of FIG. 1 configured to operate as a twelve input, one output manifold.

FIG. 3 diagrammatically illustrates the expandable RF signal matrix of FIG. 1 configured to operate as a twelve input, one output manifold in which twelve inputs out of sixteen are used and four inputs are not used. Eight inputs

101*a*, 101*b*, 101*c*, 101*d*, 101*e*, 101*f*, 101*g* and 101*h* are received and combined by RF signal routing units in the first, second and third levels, while four inputs 101*i*, 101*j*, 101*k* and 101*l* are received and combined by RF signal routing units in the first and second levels only, with the bypass 108*b* at the third level being employed. The fourth level RF signal routing unit combines the outputs of the third level RF signal routing units at the matrix output 111.

For each of the different numbers of possible inputs, different numbers of possible outputs may also be selected. For example, by using the outputs 105*a*, 105*b* and 105*c* as the matrix outputs, a 12:3 matrix circuit may be formed. Fewer than all inputs of each RF signal routing unit may also be employed. For example, a 12:4 matrix circuit could be formed using only three of four inputs for adjacent pairs of RF signal routing units in the first level, and using all four outputs 105*a*, 105*b*, 105*d* and 105*d* of the second level.

Figure 4A:
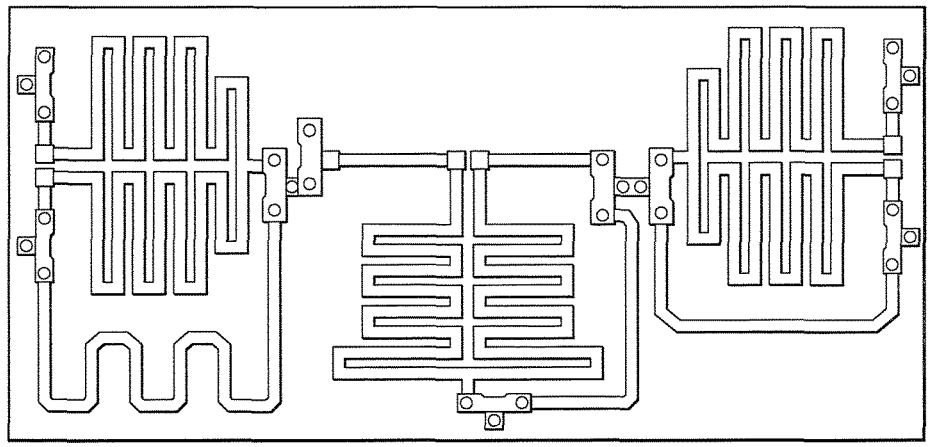
FIGS. 4A, 4B, 4C and 4D are illustrations relating to simulation of the operating of an expandable RF signal matrix in accordance with embodiments of the present disclosure.
Figure 4B:
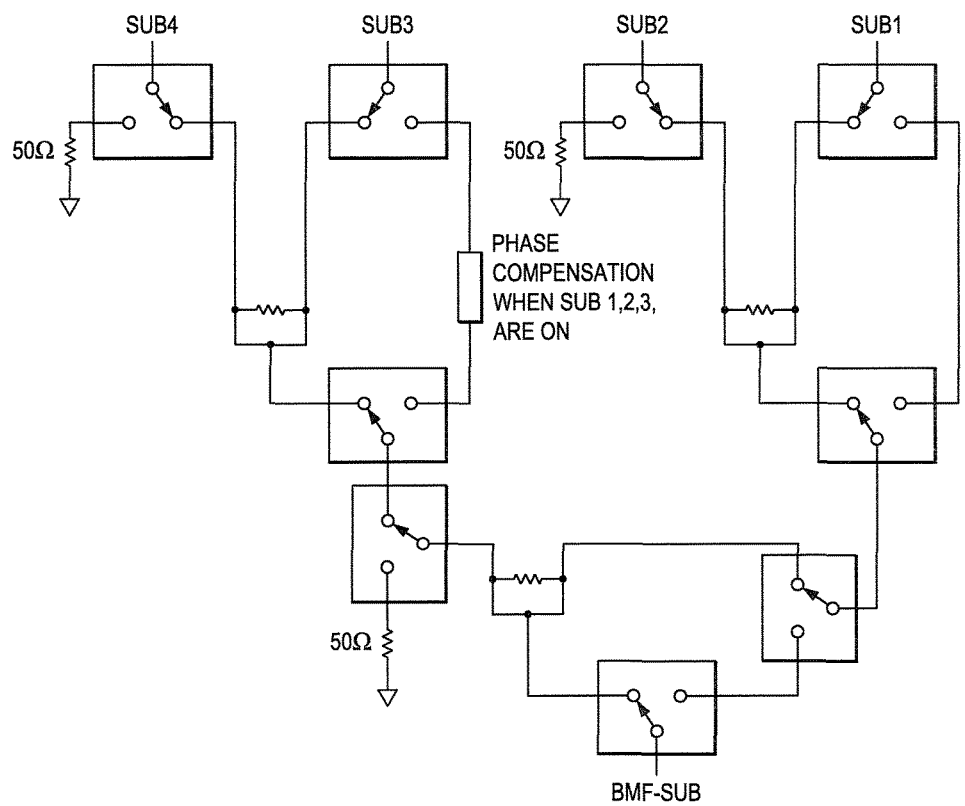

FIGS. 4A, 4B, 4C and 4D are illustrations relating to simulation of the operating of an expandable RF signal matrix in accordance with embodiments of the present disclosure. FIG. 4A illustrates a floor plan for a four input, one output RF signal matrix, and FIG. 4B depicts an equivalent circuit diagram. The structures depicted in FIGS. 4A and 4B thus model one quarter of the matrix illustrated in FIG. 1—for example, the structure between inputs 101*a*/101*b* and 101*c*/101*d* and output 107*a*. The inputs sub1, sub2, sub3 and sub 4 in FIG. 4B correspond to inputs 101*a*/101*b* and 101*c*/101*d* in FIG. 1, and the output BMF-sub in FIG. 4B corresponds to output 107*a*. The switching devices 123, 126 and 127 within the layout 120 of FIG. 1A are electrically modeled as switches, and the conductive paths 124, 125 and 128 are electrically modeled as impedances. Phase compensation when a select subset of the inputs (e.g., inputs sub1, sub2 and sub3) are employed is included. The circuit of FIG. 4B models three interconnected instances of the general layout of FIG. 1A, using the floor plan of FIG. 4A.

Figure 4C:
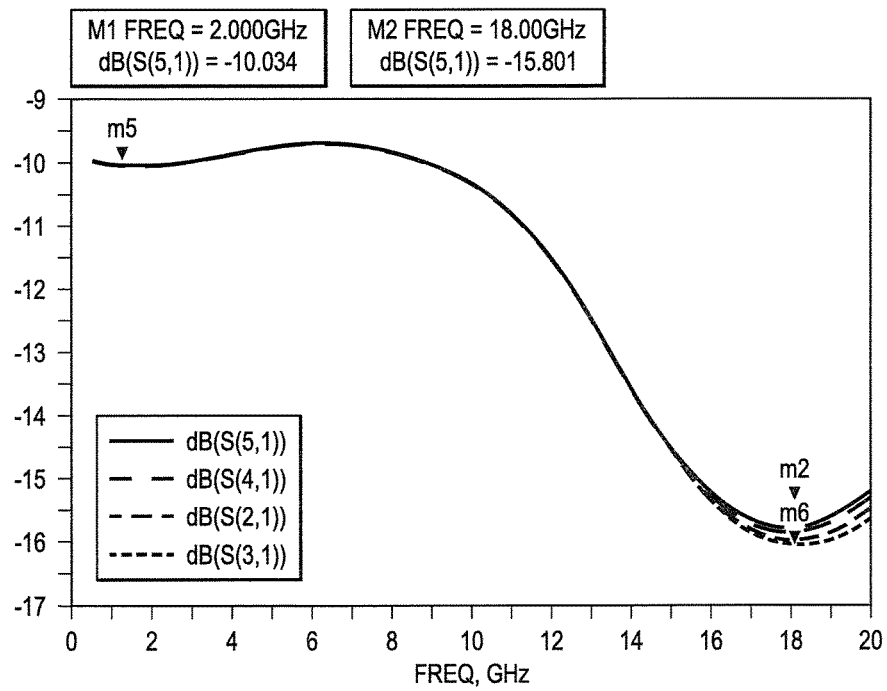
Figure 4D:
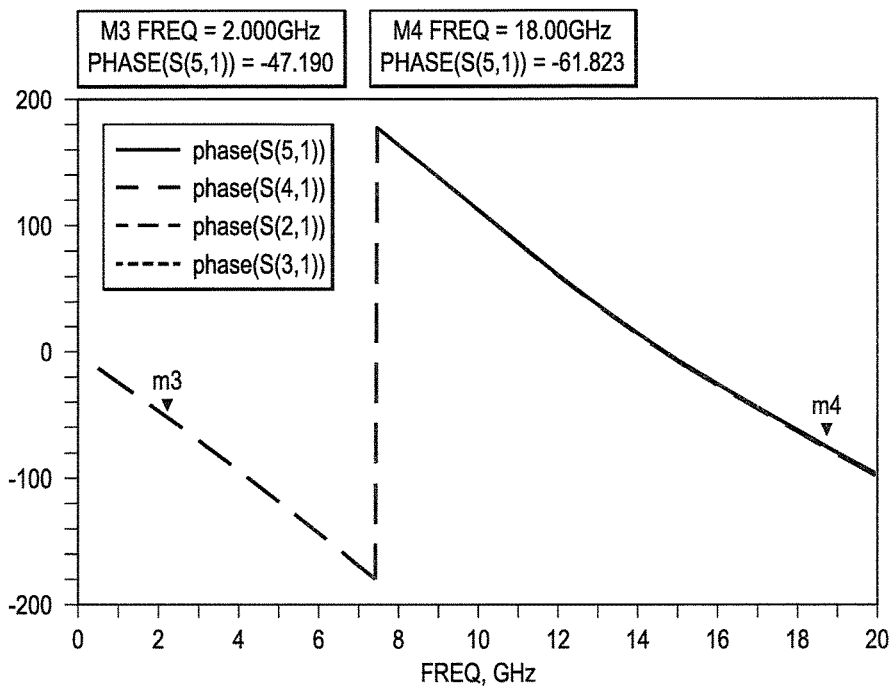

FIGS. 4C and 4D illustrate, respectively, plots as a function of frequency (in giga-Hertz or "GHz") of insertion loss in decibels (dB) of the signal path and change in phase (in degrees) for the signal path between the input(s) and the output for use of 1, 2, 3 or 4 of the inputs of the structure depicted in FIG. 4A and electrically modeled by the circuit in FIG. 4B. As apparent, the difference in signal loss and phase when using different numbers of the inputs is very small. Because unused inputs and conductive paths are electrically isolated from the outputs of each RF signal routing unit, those inputs and conductive paths do not contribute to the impedance losses at the output.

Figure 5:
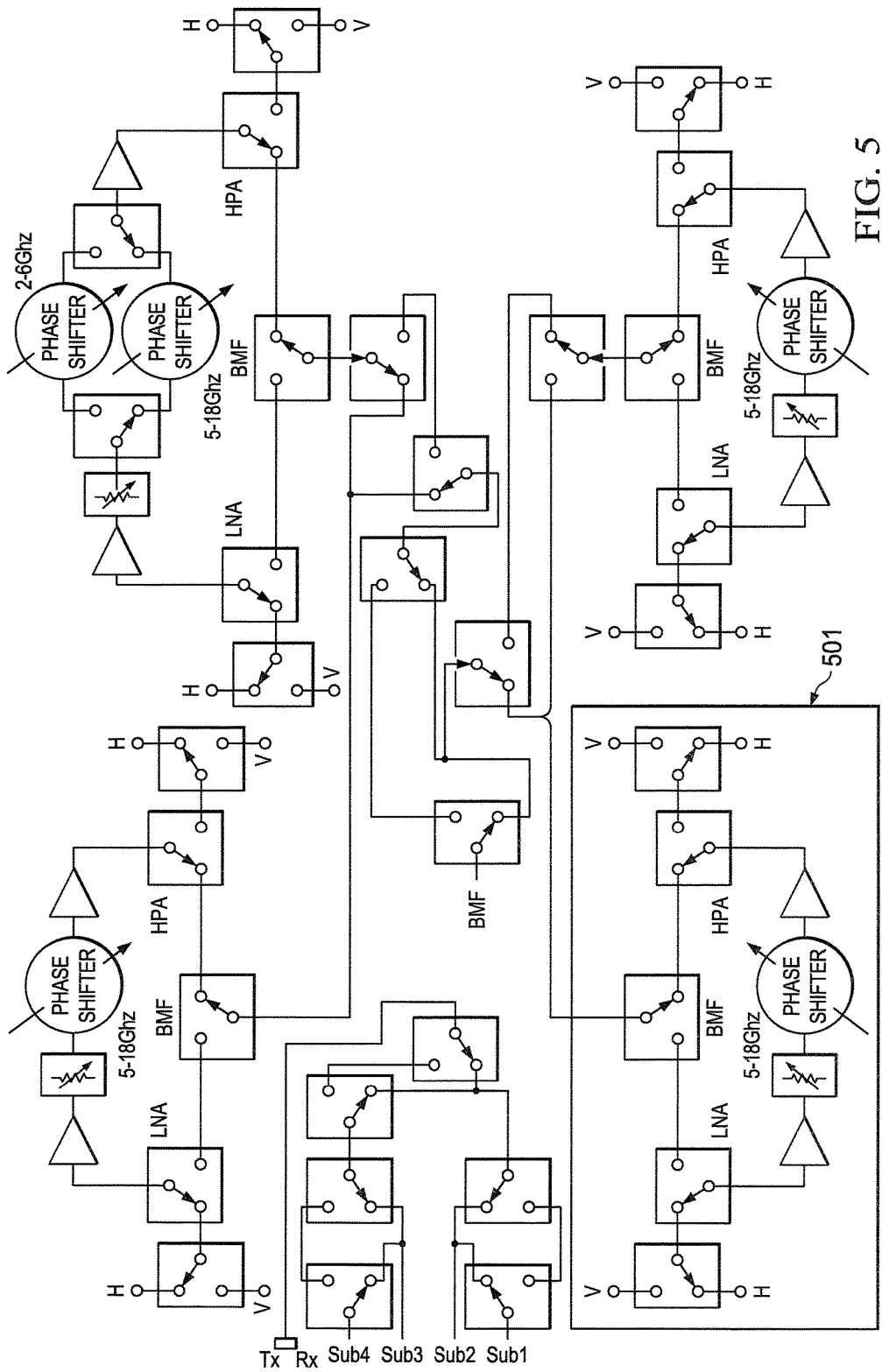
FIG. 5 depicts an accordion subarray circuit functional block diagram for a four input, one output RF signal matrix in accordance with embodiments of the present disclosure.

FIG. 5 depicts an accordion subarray circuit functional block diagram for a four input, one output RF signal matrix in accordance with embodiments of the present disclosure. The circuit depicted implements a four input (sub1, sub2, sub3 and sub 4), one output (BMF) signal matrix, where any of 1, 2, 3 or all 4 inputs may be employed without substantial change in insertion loss and phase. The circuit also includes a switch controlling whether the signal matrix is employed for transmission (TX) or reception (RX) of RF signals by a beamforming antenna. The remainder of the circuit is employed to couple the signal matrix to a beamforming antenna having multiple elements. The common leg circuit functionality 501 is duplicated four times within the circuit, and includes phase shifting (in the upper right circuit leg, alternative phase shifting is provided for phase compensation, if necessary), together with a variable resistance and a low noise amplifier (LNA) and high power amplifier (HPA) within the common leg circuit functionality. The outputs BMF of each common leg circuit 501 are selectively combined or routed to form the beamformed (BMF) output signal at the output.

The application specific integrated circuit (ASIC) floor planning for an implementation of the RF signal matrix and associated circuitry illustrated by FIG. 5 predicts only a single reticle will be required for SiGe 8HP fabrication, so no exotic fabrication processes are required. A digital core may be formed below the combiners (RF signal routing units), with the entire circuit fitting within a 10.0 millimeter (mm) by 9.88 mm area.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. §112(f) unless the words "means for" or "step for" are explicitly used in the particular claim.

What is claimed is:
1. A system, comprising:
an n input, radio frequency (RF) signal matrix comprising
  a plurality of two-to-one RF signal routing units, each
  RF signal routing unit including
    a first switching unit at an output of the respective
      signal routing unit, the first switching unit configured
      to connect the output to one of a bypass conductive
      path and a first signal combining conductive path,
    a second switching unit at a first input to the respective
      signal routing unit, the second switching unit configured
      to connect the first input to one of the bypass
      conductive path and the first signal combining conductive path,
    a third switching unit at the output configured to
      selectively connect the output to a second signal
      combining conductive path that is fixedly connected
      to a second input of the respective signal routing
      unit,
    wherein the first, second and third switching units are
      configured to operate cooperatively to one of
      connect the first input to the output via the bypass
        conductive path while electrically isolating the
        first and second signal combining conductive
        paths from the output, and
      connect the first and second inputs to the output via
        the first and second signal combining conductive
        paths while electrically isolating the bypass conductive path from the output,
  wherein the plurality of RF signal routing units are
    connected in at least two levels with outputs from a first
    level connected to inputs for a second level to form n
    inputs for the RF signal matrix, where n is a positive
    integer, and at least one output for the RF signal matrix,
    and
  wherein any number of the n inputs may be employed
    without unused inputs loading the at least one output.

2. The system according to claim 1, wherein any number of the n inputs may be employed without unused inputs contributing to insertion loss.

3. The system according to claim 1, wherein any number of the n inputs may be employed without phase change due to unused inputs.

4. The system according to claim 1, wherein all but one of the at least two levels of signal routing units include an even number of the signal routing units arranged in pairs.

5. The system according to claim 1, wherein the RF signal matrix has 16 inputs.

6. The system according to claim 5, wherein the RF signal matrix has 4 levels of RF signal routing units.

7. The system according to claim 1, wherein the bypass conductive path within each RF signal routing unit is employed to pass through a single input signal to the output, and wherein the first and second signal combining conductive paths within each RF signal routing unit are employed to combine two input signals at the output.

8. The system according to claim 1, wherein an impedance of the first signal combining conductive path matches an impedance of the second signal combining conductive path, and wherein an impedance of the bypass conductive path differs from the impedance of the first and second signal combining conductive paths.

9. The system according to claim 1, wherein at least one bypass conductive path within the RF signal matrix includes phase compensation configured to be activated when a predetermined number of the n inputs are used.

10. The system according to claim 1, wherein outputs of a plurality of the RF signal routing units may be employed to form an RF signal matrix with more than one output.

11. A method, comprising:
coupling a plurality of two-to-one radio frequency (RF) signal routing units to form an n input, RF signal matrix comprising, each RF signal routing unit including
a first switching unit at an output of the respective signal routing unit, the first switching unit configured to connect the output to one of a bypass conductive path and a first signal combining conductive path,
a second switching unit at a first input to the respective signal routing unit, the second switching unit configured to connect the first input to one of the bypass conductive path and the first signal combining conductive path, and
a third switching unit at the output configured to selectively connect the output to a second signal combining conductive path that is fixedly connected to a second input of the respective signal routing unit; and
operating the first, second and third switching units cooperatively to one of
connect the first input to the output via the bypass conductive path while electrically isolating the first and second signal combining conductive paths from the output, and
connect the first and second inputs to the output via the first and second signal combining conductive paths while electrically isolating the bypass conductive path from the output,
wherein the plurality of RF signal routing units are connected in at least two levels with outputs from a first level connected to inputs for a second level to form n inputs for the RF signal matrix, where n is a positive integer, and at least one output for the RF signal matrix, and
wherein any number of the n inputs may be employed without unused inputs loading the at least one output.

12. The method according to claim 11, wherein any number of the n inputs may be employed without unused inputs contributing to insertion loss.

13. The method according to claim 11, wherein any number of the n inputs may be employed without phase change due to unused inputs.

14. The method according to claim 11, wherein all but one of the at least two levels of signal routing units include an even number of the signal routing units arranged in pairs.

15. The method according to claim 11, wherein the RF signal matrix has 16 inputs.

16. The method according to claim 15, wherein the RF signal matrix has 4 levels of RF signal routing units.

17. The method according to claim 11, wherein the bypass conductive path within each RF signal routing unit is employed to pass through a single input signal to the output, and wherein the first and second signal combining conductive paths within each RF signal routing unit are employed to combine two input signals at the output.

18. The method according to claim 11, wherein an impedance of the first signal combining conductive path matches an impedance of the second signal combining conductive path, and wherein an impedance of the bypass conductive path differs from the impedance of the first and second signal combining conductive paths.

19. The method according to claim 11, wherein at least one bypass conductive path within the RF signal matrix includes phase compensation configured to be activated when a predetermined number of the n inputs are used.

20. The method according to claim 11, further comprising:
employing outputs of a plurality of the RF signal routing units to form an RF signal matrix with more than one output.

* * * * *